Figures 1, 2:
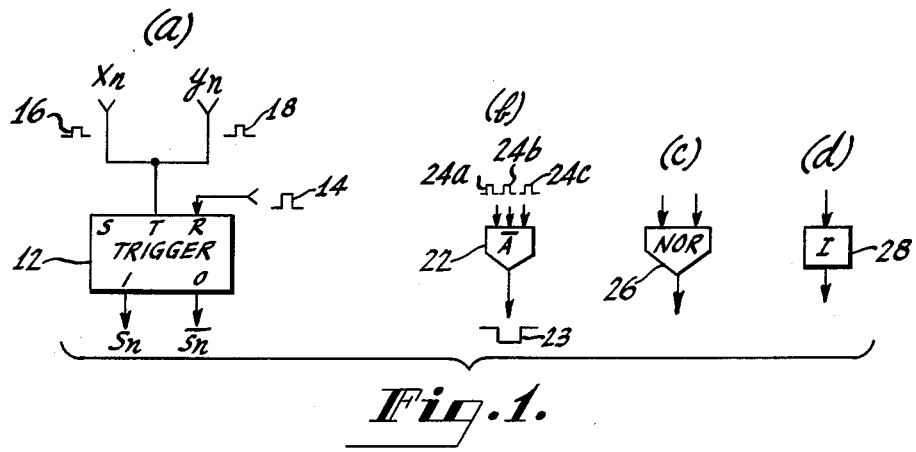

May 28, 1963

M. C. ARYA 3,091,392

BINARY MAGNITUDE COMPARATOR

Filed June 20, 1960

2 Sheets—Sheet 1

"1" = HIGH
"0" = LOW

INVENTOR.
MICHAEL C. ARYA
BY John V. Regan
ATTORNEY

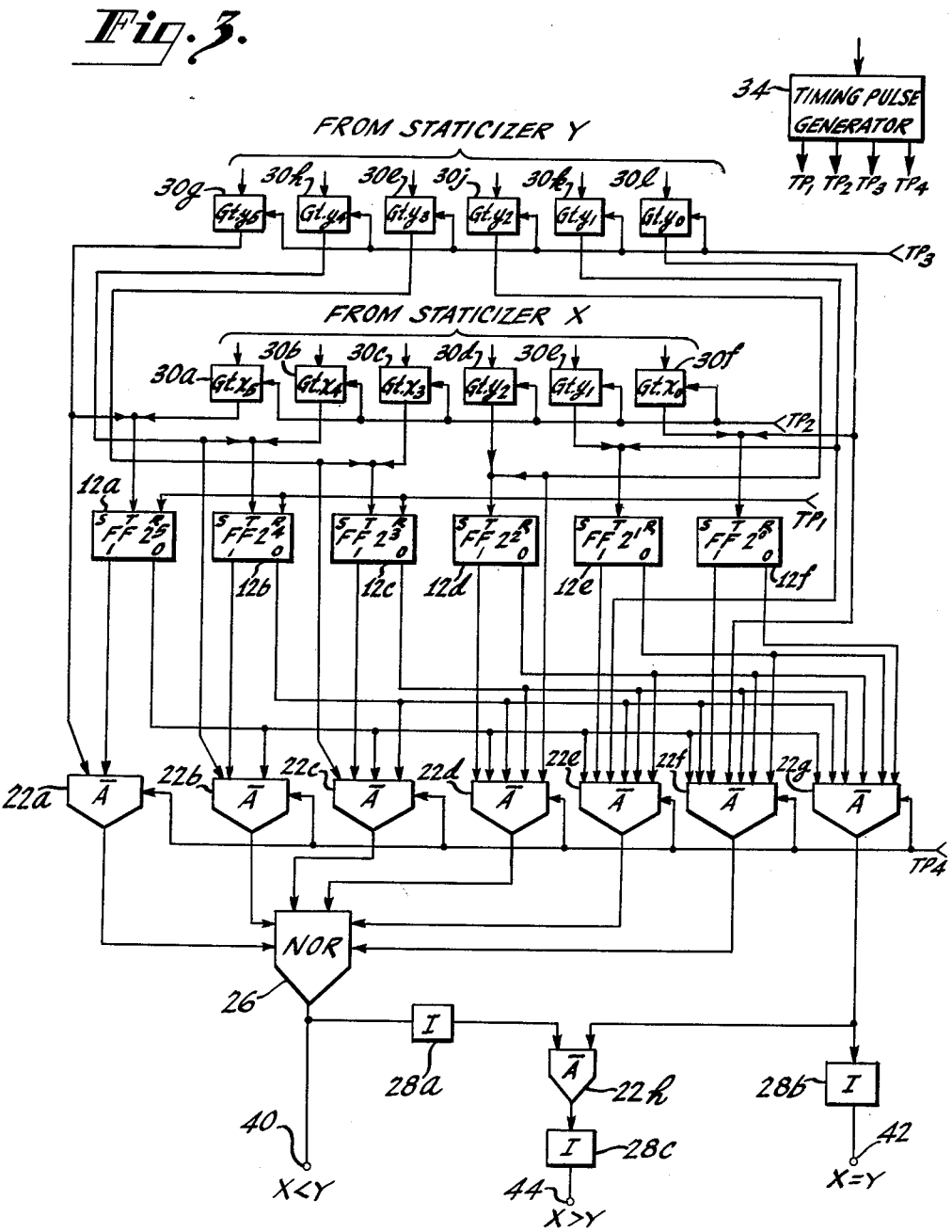

United States Patent Office 3,091,392
Patented May 28, 1963

3,091,392
BINARY MAGNITUDE COMPARATOR
Michael C. Arya, Haddonfield, N.J., assignor to Radio Corporation of America, a corporation of Delaware
Filed June 20, 1960, Ser. No. 37,485
13 Claims. (Cl. 235—177)

This invention relates in general to comparators and, more particularly, to devices for comparing two binary quantities.

Comparators are known which provide an output only when the two quantities being compared are equal, or vice-versa. It frequently is required in a digital system to compare two binary quantities and to provide an indication whenever a particular one of the quantities has the greater magnitude. A more versatile comparator device, one which may be used in several different data handling operations, is one which provides an indication of the relative magnitudes of the quantities being compared. More specifically, such a comparator device provides not only an indication of equality, but also an indication of which quantity is greater when the quantities are unequal. It is desirable in the operation of such a device that the various binary digits of the quantities be handled in parallel as opposed to serially in order that the system may operate at higher speed. It is also desirable that the comparator be of simple construction and that it be expandable.

Therefore, it is an object of this invention to provide an improved device for comparing binary quantities.

It is another object of this invention to provide a comparator device for comparing rapidly binary information encoded as parallel digits.

It is still another object of the invention to provide an improved comparator device which provides an indication when one of the digital quantities being compared has a greater magnitude than the other.

Another object of this invention is to provide an improved comparator which will provide an indication when the digital quantities being compared are equal, and which will indicate which quantity is larger when the quantities being compared are unequal.

Still another object of the invention is to provide a comparator of the type described which is simple in construction and which has a reduced number of components.

Yet another object of the invention is to provide a comparator which has a small time delay, in terms of the number of logic stages, between input and output.

The present invention achieves the above and other objects in the preferred form of the invention by a plurality of individual comparison circuits, one for each digit position of a quantity of character. Each two digits of like significance in the quantities are applied to the associated comparison circuit. Each comparison circuit has two outputs of opposite phase or polarity. The first output is the "exclusive" sum of the two digits; the second output is the complement of the first output. A like plurality of coincidence gates are provided, one for each digit position. Each gate receives said first output of a corresponding comparison circuit and the digit input of like significance of one of the quantities being compared. Each gate also receives said second outputs from each of the comparator circuits of higher order significance. An output from any of these gates indicates that said one quantity has a greater binary magnitude than the other. All of the second outputs of the comparator circuits are connected to an additional coincidence gate, and an output therefrom indicates that the quantities being compared are equal. Absence of an output indication from any of the gates aforesaid indicates that the other of said quantities has the greater binary magnitude.

In the accompanying drawing, like reference numerals refer to like components and;

FIGURES 1(a) ... 1(d) are block diagrams of components which comprise the major portion of the comparator device;

FIGURE 2 is a table of values of the outputs of the FIGURE 1(a) comparison circuit for different combinations of inputs thereto; and FIGURE 3 is a block diagram of the comparator device.

The comparator device of the present invention may be constructed of components and devices which are known in the digital information handling field. Some of these components are illustrated in block form in FIGURES 1(a) ... 1(d) and will be described now briefly as an aid to greater reader understanding of the invention. FIGURE 1(a) is a block diagram of a suitable form of comparison circuit 12. The circuit 12 illustrated is a trigger circuit having set (S), trigger (T) and reset (R) input terminals and a pair of output terminals, designated (1) and (0). The trigger circuit 12 initially is reset by a positive pulse 14 applied at the reset (R) input terminal. The (0) output is relatively high at this time, corresponding to the binary "1," and may have a value of zero volts, for example. The (1) output is relatively low at this time, corresponding to binary "0," and may have a value of −6 volts, for example. Electrical signals representing two binary digits $x_n$ and $y_n$ to be compared are coupled sequentially to the trigger (T) input terminal. Only positive input pulses, representing binary "1," are effective to trigger the circuit 12.

Assume that a first positive pulse 16 is applied to the trigger (T) input terminal. This pulse 16 corresponds to a binary "1" in the $n+1$th digit position of a multi-digit binary quantity X and has the proper polarity to trigger the circuit 12 to the set state, whereupon the outputs at the (1) and (0) output terminals reverse. The (1) output is then high (binary "1") and the (0) output is low (binary "0"). A positive pulse 18 applied at a later time at the trigger (T) input terminal has the proper polarity to trigger the circuit 12 back to the reset state. The positive pulse 18 represents a binary "1" digit in the $n+1$th digit position of a binary quantity Y.

The (1) output of the trigger circuit is designated "$s_n$" and the (0) output is designated "$\bar{s}_n$," which means "not $s_n$" and is the complement of $s_n$ in the binary system of notation. The term "$s_n$" is defined by the following Boolean algebra expression for simple binary addition (defining the function performed by a half adder, neglecting the carry term):

$$s_n = x_n \mp y_n \tag{1}$$

where the symbol "$\mp$" is the logical exclusive "or" connective. To avoid confusion with symbols and terminology frequently used in Boolean notation, the term "$s_n$" is referred to hereinafter as the "exclusive sum."

The table of FIGURE 2 illustrates in tabular form the $s_n$ and $\bar{s}_n$ outputs which exist in response to various combinations of signals applied at the trigger (T) input terminal. It is to be noted in the table that the (1) output $s_n$, is low, corresponding to binary "0," when the digits $x_n$ and $y_n$ are equal and is high, corresponding to binary "1," when the digits being compared are unequal. The $\bar{s}_n$ output is the complement of the $s_n$ output.

A suitable trigger circuit for use in practicing the invention is the triggerable flip-flop illustrated at page 209, Figure 203, of the Army Technical Manual No. 11–690, entitled "Basic Theory and Application of Transisors." When the Figure 203 circuit is used in the present invention, the diodes CR2 and CR3 may be clamped at −6 volts, and the diodes CR1 and CR4 may be clamped at circuit ground. The Figure 203 circuit may be reset by applying a positive pulse to the base electrode of transistor Q1. Under these circumstances, the (1) output may be derived at the collector electrode of transistor Q1, and the (0) output may be derived at the collector electrode of transistor Q2.

The block designated "A" in FIGURE 1(b) represents a "not and" coincidence gate which has the characteristic that the output 23 thereof is high in the quiescent condition, and remains high until all of the inputs are energized at the same time by positive going pulses 24a . . . 24c, whereupon the output goes low. The "not and" gate is essentially an "and" gate having an inverted output. A suitable "not and" gate for purposes of this invention is illustrated at page 213, Figure 208, of the aforementioned Army Manual.

The block 26 designated "nor" in FIGURE 1(c) is a multiple input gate which has the property that the output thereof is low in the quiescent condition and goes high, for example, to 0 volts, whenever a negative going pulse is applied at any input terminal. A suitable gate for this purpose is illustrated at page 211, Figure 206, of the aforementioned Army Manual.

The block 28 designated "I" in FIGURE 1(d) is an inverter circuit which provides a low output when the input thereto is high, and a high output when the input thereto is low. The inverter circuit 26 may be, for example, the "nor" gate 26 of FIGURE 1(c) having a single input.

Description of the Comparator

A binary number A in the usual positional notation may be expressed as follows:

$$A = a_n\, a_{n-1} \ldots a_3\, a_2\, a_1\, a_0 \tag{2}$$

where $a_n$ is the binary digit of the $n+1$th binary position, counting from the right. The digits are arranged, or "ordered," from right to left in ascending powers to the base two. Any digit may have a binary value of "1" or "0."

Let X and Y be two six-digit binary quantities to be compared. The quantities may be numbers in the conventional binary code and may be represented as follows.

$$X = x_5\, x_4\, x_3\, x_2\, x_1\, x_0 \tag{3}$$

$$Y = y_5\, y_4\, y_3\, y_2\, y_1\, y_0 \tag{4}$$

In accordance with the previous description of FIGURE 1(a) and FIGURE 2, the following additional binary algebraic expressions may readily be derived.

$$s_5 = x_5 \mp y_5;\quad \bar{s}_5 = 1 \mp s_5 \tag{5}$$

$$s_4 = x_4 \mp y_4;\quad \bar{s}_4 = 1 \mp s_4 \tag{6}$$

$$s_3 = x_3 \mp y_3;\quad \bar{s}_3 = 1 \mp s_3 \tag{7}$$

$$s_2 = x_2 \mp y_2;\quad \bar{s}_2 = 1 \mp s_2 \tag{8}$$

$$s_1 = x_1 \mp y_1;\quad \bar{s}_1 = 1 \mp s_1 \tag{9}$$

$$s_0 = x_0 \mp y_0;\quad \bar{s}_0 = 1 \mp s_0 \tag{10}$$

It may be seen from Formula 5 and the previous description of FIGURE 1(a) that the two binary digits $x_5$ and $y_5$ are of equal value when $s_5$ has the value of binary "0"; $\bar{s}_5$ then has the value of "1." It may be deduced that the binary value of $x_5$ is less than that of $y_5$ ($x_5 < y_5$) when $y_5$ has the value of "1" and $s_5$ also has the value of "1." In like manner $x_5$ is greater than $y_5$ ($x_5 > y_5$) when $x_5$ and $s_5$ each has a value of binary "1."

Consider now the aforementioned two six-digit quantities, X and Y. The relative magnitudes of these quantities may be determined according to the following logical Boolean equations derived from the above formulae:

$X = Y$ when $$\bar{s}_5 \cdot \bar{s}_4 \cdot \bar{s}_3 \cdot \bar{s}_2 \cdot \bar{s}_1 \cdot \bar{s}_0 = 1 \tag{11}$$

$X < Y$ when $$\begin{aligned}s_5 \cdot y_5 &+ \bar{s}_5 \cdot s_4 \cdot y_4 + \bar{s}_5 \cdot \bar{s}_4 \cdot s_3 \cdot y_3 \\ &+ \bar{s}_5 \cdot \bar{s}_4 \cdot \bar{s}_3 \cdot s_2 \cdot y_2 + \bar{s}_5 \cdot \bar{s}_4 \cdot \bar{s}_3 \cdot \bar{s}_2 \cdot s_1 \cdot y_1 \\ &+ \bar{s}_5 \cdot \bar{s}_4 \cdot \bar{s}_3 \cdot \bar{s}_2 \cdot \bar{s}_1 \cdot s_0 \cdot y_0 = 1\end{aligned} \tag{12}$$

$X > Y$ when $$\begin{aligned}s_5 \cdot \bar{y}_5 &+ \bar{s}_5 \cdot s_4 \cdot \bar{y}_4 + \bar{s}_5 \cdot \bar{s}_4 \cdot s_3 \cdot \bar{y}_3 \\ &+ \bar{s}_5 \cdot \bar{s}_4 \cdot \bar{s}_3 \cdot s_2 \cdot \bar{y}_2 + \bar{s}_5 \cdot \bar{s}_4 \cdot \bar{s}_3 \cdot \bar{s}_2 \cdot s_1 \cdot \bar{y}_1 \\ &+ \bar{s}_5 \cdot \bar{s}_4 \cdot \bar{s}_3 \cdot \bar{s}_2 \cdot \bar{s}_1 \cdot s_0 \cdot \bar{y}_0 = 1\end{aligned} \tag{13}$$

In the above Formulae 11 . . . 13, the symbol "." is the logical "and" connective and the symbol "+" is the inclusive "or" connective. The quantity to the left of the equal sign, "=", in Formula 11, for example, has the value of "1" only when each of the individual quantities $\bar{s}_n \ldots \bar{s}_0$ has the value of "1."

The preferred form of comparator according to the invention mechanizes the above Formulae 11 and 12 and comprises components of the general type illustrated in FIGURE 1. Applicant has recognized that separate circuitry for mechanizing Formula 13 is unnecessary because X is greater than Y when X is not equal to Y and is not less than Y.

The preferred form of comparator is illustrated in block form in FIGURE 3. Common connections, circuit ground for example, are omitted for clarity of drawing. The six-digit binary quantity X may be staticized in a device (not shown), which may be a staticizer of the type illustrated and described in Patent No. 2,907,989, issued October 6, 1959, to Howard P. Guerber, and assigned to the assignee of the present invention. The six-bit output of this staticizer is applied in parallel to a set of two-input coincidence gates 30a . . . 30f. The gates 30a . . . 30f are marked in FIGURE 3 to indicate the particular binary digits normally received by the gates. The coincidence, or "and," gates are known in the art and are of the type which provide a high output only when each input thereto is high. A timing pulse $tp_2$ is applied to the second input terminal of each of the gates 30a . . . 30f. The timing pulse may be one output of a timing pulse generator 34, which provides at least four timing pulses $tp_1 \ldots tp_4$ in response to each input pulse thereto. The timing pulse generator 34 may be, for example, a tapped delay line, and the input may be derived from an oscillator or other clock source within the data handling system.

A second set of similar coincidence gates 30g . . . 30l receive first inputs in parallel from a second signal staticizer (not shown). This staticizer may store the six digits of the character Y which is to be compared with the aforementioned character X. The $tp_3$ timing pulse is applied as a second input to each of the second set of gates 30g . . . 30l. The outputs of the left-most, or highest order digit, gates 30a, 30g of the two sets are connected to the trigger (T) input terminal of an associated trigger circuit 12a of the type described previously. The gates 30a . . . 30f and 30g . . . 30l, and the trigger circuits 12a . . . 12f are arranged from left to right, as viewed in FIGURE 3, in descending order of digit significance. The outputs of the second gates 30b, 30h, or gates of next lower order, of each set are connected to the trigger (T) input of the second trigger circuit 12b. The outputs of each other pair of gates of like order (for example, 30c and 30i . . . 30f and 30l) are connected to the trigger (T) input of the trigger circuit 12c . . . 12f of like order. The $tp_1$ timing pulse is applied to the reset (R) input terminals of all trigger circuits 12a . . . 12f to reset the circuits.

A set of six "not and" gates 22a . . . 22f are associated with the trigger circuits 12a . . . 12f, respectively, and the gates 30g . . . 30l, respectively. Each "not and" gate 22a . . . 22f, receives as first and second inputs the (1)

output of the associated trigger circuit 12a . . . 12f, respectively, and the output of the associated gate 30g . . . 30l, respectively. In addition, each of the "not and" gates 22b . . . 22f is connected at other of its inputs to the (0) output terminals of all trigger circuits 12a . . . 12l of higher order significance. For example, the "not and" gates 22b . . . 22f receive the (0) output of the trigger circuit 12a of highest order. The "not and" gates 22c . . . 22f all receive the (0) output of the trigger circuit 12b of next highest order, etc. An additional "not and" gate 22g is connected to receive the (0) outputs of all of the trigger circuits 12a . . . 12f. The $tp_4$ timing pulse is applied at another input terminal of each of the "not and" gates 22a . . . 22g.

A six input "nor" gate 26 of the type described previously has its inputs connected to the outputs of the set of six "not and" gates 22a . . . 22f. The output of the "nor" gate 26 is connected to an output terminal 40 and to the input of a first inverter circuit 28a. The voltage at the output terminal 40 is normally low and goes high only when the quantity X is less than the quantity Y.

The output of said additional "not and" gate 22g is connected to the input of a second inverter circuit 28b, and also to one input of a two-input "not and" gate 22h. A second input to this "not and" gate 22h is the output of the first inverter circuit 28a. The output of the second inverter circuit 28b is connected to an output terminal 42. This output is high when the two quantities being compared are equal. The output of the "not and" gate 22h is connected to the input of a third inverter circuit 28c, the output of which is connected to an output terminal 44. This output goes high whenever the quantity X is greater than the quantity Y.

*Operation of the Comparator*

Consider the quiescent state of the comparator with no quantities being compared. The $tp_1$ timing pulse resets all of the trigger circuits 12a . . . 12f. The (0) outputs of the trigger circuits 12a . . . 12f are high at this time and the (1) outputs are low. No positive trigger pulses are applied to the trigger (T) terminals of the trigger circuits 12a . . . 12f in response to the $tp_2$ and $tp_3$ timing pulses because no binary "1" signals are present at the inputs of any of the "and" gates 30a . . . 30f and 30g . . . 30l, respectively.

Each of the set of six "not and" gates 22a . . . 22f receives a low input from the (1) output terminal of its associated trigger circuit 12a . . . 12f. The additional "not and" gate 22g, however, receives high inputs from all of the (0) output terminals of the trigger circuits 12a . . . 12f. The output of this "not and" gate 22g, therefore, goes low in response to the $tp_4$ timing pulse. This low output is inverted by the inverter circuit 28b to provide a high voltage at the output terminal 42, indicating that $X = Y$. A high voltage appears at the output terminal 42 in response to the $tp_4$ timing pulse whenever two quantities X and Y being compared are equal. This is so because the (0) outputs of the trigger circuits 12a . . . 12f are high whenever the circuits are reset, and a trigger circuit is always reset after receiving two digit signals of equal binary value at its trigger terminal.

The low output of the "not and" gate 22g is coupled to one input terminal of the "not and" gate 22h. The output of this "not and" gate 22h is therefore high, and the voltage at the output terminal 44 is low. The "nor" gate 26 output is low because no low input is received from any of the "not and" gates 22a . . . 22f.

Consider now the case where the binary quantities X and Y are as follows:

$$X = 101100$$
$$Y = 110000$$

The quantity Y has a greater magnitude than the quantity X. The $tp_1$ timing pulse resets all of the trigger circuits 12a . . . 12f. Positive trigger pulses from "and" gates 30a, 30c and 30d trigger the first, third and fourth trigger circuits 12a, 12c and 12d, respectively, to the set state in response to the $tp_2$ timing pulse. At $tp_3$, the first trigger circuit 12a is reset by the positive output of the "and" gate 30g, and the second trigger circuit is set by the positive output of the "and" gate 30h.

The "not and" gate 22g receives low outputs from the (0) output terminals of the trigger circuits 12b, 12c and 12d at this time. Consequently, the output of this "not and" gate remains high in response to the $tp_4$ timing pulse and the voltage at the output terminal 42 remains low. The second "not and" gate 22b, however, receives high inputs from the (0) output of the first trigger circuit 12a, the (1) output of the second trigger circuit 12b, and the output of the input "and" gate 30h. The output of this "not and" gate 22b therefore goes low in response to the $tp_4$ timing pulse. The "nor" gate 26 provides a high output at the output terminal 40 in response to the low input from "not and" gate 22b. The high output at the output terminal 40 indicates that Y is greater than X.

The high output of the "nor" gate 26 is inverted by the inverter circuit 28a. The low output of the inverter circuit 28a applied to the "not and" gate 22h causes the voltage at the output terminal 44 to remain low.

Consider now the case where the quantities being compared are as follows:

$$X = 110000$$
$$Y = 101100$$

The quantity X has a greater magnitude than the quantity Y. The trigger circuits 12a . . . 12f are reset initially by the $tp_1$ timing pulse. At $tp_2$, the first and second trigger circuits 12a, 12b, respectively, are set by the high outputs of the input "and" gates 30a, 30b, respectively. The first trigger circuit 12a is reset, and the third and fourth trigger circuits 12c and 12d are set at $tp_3$ by the high outputs of the input "and" gates 30g, 30i and 30j, respectively.

The output of the "not and" gate 22g does not go low in response to the $tp_4$ timing pulse because of the low outputs at the (0) output terminals of the second, third and fourth trigger circuits 12b, 12c, 12d, respectively. The voltage at the output terminal 42, therefore, remains low. The output of the first "not and" gate 22a does not go low because of the low input received from the (1) output terminal of the first trigger circuit 12a. The second "not and" gate 22b receives a low input from the output of the "and" gate 30h, and this "not and" gate 22b, therefore, does not provide a low output. Because the second trigger circuit 12b is set, the (0) output thereof is low. One input of each of the "not and" gates 22c . . . 22f is connected to the (0) output of the second trigger circuit 12b, and none of these "not and" gates therefore provides a low output. Consequently, all inputs to the "nor" gate 26 are high and the voltage at the output remains low.

The low output of the "nor" gate 26 is inverted by the inverter circuit 28a and applied as a high input to the "not and" gate 22h. This "not and" gate 22h also receives a high input from the output of "not and" gate 22g. A low output is, therefore, provided by the "not and" gate 22h. This low output is inverted by the inverter circuit 28c to provide a high voltage at the output terminal 44, which high voltage indicates that the quantity X is greater than the quantity Y.

The foregoing example operates to compare two binary quantities of six or fewer digits. However, the system may be expanded in conformity with the above teachings to compare two binary quantities of any desired number of digits.

What is claimed is:

1. A device for comparing two multidigit binary quantities and for providing an indication when the magnitude of a first of said quantities is less than the magnitude of the second of said quantities, each digit being represented by an electrical signal of one of two values depending upon the binary value, said device comprising: a plurality of means each connected to receive the electrical signals representing a different pair of binary digits of like significance and to provide a first output signal representing the exclusive sum of said pair of binary digits and a second output signal which is the complement of said first output signal; a like plurality of gates each associated with a different one of said sum output providing means; means coupling each said first output signal and the electrical signal of like significance of the second of said quantities to the associated one of said gates; means coupling each said second output signal to the ones of said gates of lesser significance; and means for detecting an output from any one of said gates as the desired said indication.

2. The combination as claimed in claim 1 wherein said means for detecting is a "nor" gate and each of said gates is a "not and" gate.

3. The combination as claimed in claim 1, wherein said sum signal providing means are comparison circuits.

4. The combination as claimed in claim 3 wherein each of said comparison circuits is a bistable trigger circuit.

5. The combination as claimed in claim 4 including means for resetting said trigger circuits to a reference state wherein each said first output signal corresponds to binary "zero."

6. The combination as claimed in claim 5 including means for sequentially coupling each of the electrical signals representing a said pair of digits of like significance to the associated one of said trigger circuits.

7. A system for comparing two binary quantities, each digit of said quantities being represented by an electrical signal of one of two values, said system comprising: a plurality of comparison circuits each connected to receive the electrical signals of a distinct pair of digits of like significance, and to provide a first output signal representing the "exclusive" sum of said pair of digits and a second output signal which is the binary complement of said first output signal; a like plurality of gate means each connected to receive said first output of a different one of said comparison circuits, the said electrical signal of like significance of the first of said quantities, and the said second output signal of each of said comparison circuits of greater significance; means for detecting an output of any of said gate means; and an additional gate means connected to receive the said second output of each of said comparison circuits.

8. The combination as claimed in claim 7 wherein said means for detecting provides an output signal indication whenever all of the signal inputs to any one of said plurality of gate means represent binary "one's," said output indication indicating that the magnitude of the first of said quantities is greater than the magnitude of the second of said quantities.

9. The combination as claimed in claim 8 wherein said additional gate means provides an output signal whenever all inputs to said additional gate means are binary "one's," said gate output signal indicating that said quantities are equal in magnitude.

10. The combination as claimed in claim 9 including a coincidence gate connected to the outputs of said means for detecting and said additional gate means for providing an output signal in the absence of said output signal indication and said gate output signal, said output signal from said coincidence gate indicating that the second of said quantities is greater in magnitude than said first of said quantities.

11. The combination as claimed in claim 7 wherein said comparison circuits are bistable trigger circuits.

12. The combination as claimed in claim 11 including means for resetting said trigger circuits periodically to a reference state.

13. The combination as claimed in claim 12 including means for sequentially coupling the electrical signals of each said pair of digits of like significance to the associated said one of said trigger circuits.

References Cited in the file of this patent
UNITED STATES PATENTS 2,885,655    Smoliar _____ May 5, 1959
2,959,768    White et al. _____ Nov. 8, 1960